United States Patent [19]

Tomita

[11] 3,718,495
[45] Feb. 27, 1973

[54] HEAT-SHRINKABLE PRESSURE-SENSITIVE ADHESIVE TAPE

[75] Inventor: Jun Tomita, St. Paul, Minn.

[73] Assignee: Minnesota Mining and Manufacturing Company, St. Paul, Minn.

[22] Filed: Feb. 12, 1971

[21] Appl. No.: 115,093

Related U.S. Application Data

[63] Continuation-in-part of Ser. No. 513,537, Dec. 13, 1965, abandoned.

[52] U.S. Cl. ............... 117/7, 117/68.5, 117/76 A, 117/122 PF, 117/138.8 F, 117/138.8 UA
[51] Int. Cl. ........................... C09j 7/02, B05c 3/107
[58] Field of Search ....... 117/122 PF, 138.8 F, 76 A, 117/68.5, 138.8 UA

[56] References Cited

UNITED STATES PATENTS

| | | | |
|---|---|---|---|
| 2,876,067 | 3/1959 | Nagel et al. | 117/138.8 |
| 2,762,720 | 9/1956 | Michel | 117/65 |
| 3,251,809 | 5/1966 | Lockwood et al. | 260/75 |
| 3,236,677 | 2/1966 | Bradstreet | 117/68.5 |
| 3,405,833 | 10/1968 | Salzinger et al. | 215/96 |
| 2,790,286 | 4/1957 | Snyder | 53/41 |
| 2,553,816 | 5/1951 | Ebel | 117/122 |
| 3,241,662 | 3/1966 | Robinson et al. | 206/59 |
| 3,197,326 | 7/1965 | Webber | 117/76 |
| 2,973,286 | 2/1961 | Ulrich | 117/122 |
| 3,251,713 | 5/1966 | Crone | 117/122 |

*Primary Examiner*—William D. Martin
*Assistant Examiner*—Bernard D. Pianalto
*Attorney*—Kenney, Alexander, Sell, Steldt & DeLaHunt

[57] ABSTRACT

Heat-shrinkable electrically insulative pressure-sensitive adhesive tape made from 1) a backing selected from polyethylene terephthalate and polyvinyl chloride backings that shrink at a useful elevated temperature at least twice as much in length as in width and shrink within the ranges of 10–50 percent in length and 0–15 percent in width and 2) a pressure-sensitive adhesive that exhibits a high shear strength and a high viscosity.

8 Claims, No Drawings

HEAT-SHRINKABLE PRESSURE-SENSITIVE ADHESIVE TAPE

This application is a continuation-in-part of application Ser. No. 513,537, filed Dec. 13, 1965, and now abandoned.

The heat-shrinkable tape of the present invention, which is the first known pressure-sensitive adhesive tape having useful properties of heat-shrinkability, provides superior insulative coverings when wrapped around an article and heat-shrunk. Preferred kinds of the new tape, which are both width- and length-shrinkable, are wrapped around cylindrical electrical components in a width greater than the axial dimension of the component and then shrunk down to cover at least a portion of the transverse end of the component. Another advantage of a heat-shrinkable tape of the invention is that, in general, such a tape provides a tighter, more firm covering than that provided by earlier non-shrinkable tapes.

Tape of the invention is also useful to provide physical protection and perform holding functions. The tape may be used, for example, to tightly hold together a bundle of electrical conductors or to provide a tight seal over the edges of a container closure.

A useful heat-shrinkable pressure-sensitive adhesive tape, it has been found, must have a controlled shrinkage, shrinking substantially more in the longitudinal direction than in the width direction. It is preferable that the tape show some shrinkage in the width direction to accomplish the best coverage of the transverse end surface of the article wrapped. The tape should shrink its prescribed amount at a predetermined temperature, and after shrinking that amount should be dimensionally stable at the shrinking temperature or lower. Further, the backing of the tape should be flexible and tough, moisture- and solvent-resistant (i.e., resistant to typical organic solvents), and should have biaxial strength at the shrinking temperature os that the tape withstands the tensions of the shrinking operation, especially if it is drawn down over protrusions. The heat-shrinkable backing may include materials such as non-woven webs that do not interfere with the shrinking process.

It has been found that the necessary features are obtained with a tape that includes a strong, tough backing that shrinks upon exposure to a useful elevated temperature (such as 200°–400° F.) at least twice as much in length as in width and within the range between about 10 and 50 percent in length and between about 0 and 15 percent in width, preferably between about 15 and 30 percent in length and between about 5 and 10 percent in width. Preferably, this backing is a biaxially-oriented, biaxially-differentially heat-shrinkable polyethylene terephthalate film as disclosed in a patent of Merle L. Erickson, U.S. Pat. No. 3,631,899.

Since the tape is first wrapped in contact with a surface in the conventional manner and then shrunk, special requirements exist for the adhesive. The adhesive must be firmly united to the tape backing and sufficiently cohesive to avoid excessive shearing when shrinkage forces develop in the tape upon its exposure to heat. If the adhesive is too weak the tape may unwind and if the adhesive shears excessively the tape shrinks and leaves an exposed sticky dust-collecting layer of adhesive. Further, if the adhesive is too soft, the end of the shrunken tape will lift away from its surface of application.

The necessary internal strength and firmness standards of the adhesive material can be established by shear and viscosity tests. One appropriate shear test is the method described in ASTM D1000-64, section 57(a) entitled Bond Separation During Cure, with the only deviation being the use of a 100-gram weight in place of a 50-gram weight. Half-inch-wide strips of tape based on an inert non-stretchy, non-shrinkable film such as biaxially-oriented and highly heat-set polyethylene terephthalate film are fastened together to form a ½ inch by ½ inch adhesive-to-adhesive lap joint. A 100-gram weight is fastened to one end of one strip and the specimen is hung by the other end of the other strip in an oven maintained at 130° C with the weight freely suspended. The time in minutes for the bond to separate by shearing at this temperature is the shear strength. Using this test as an indication, adhesives that exhibit a shear strength value of 60 minutes or more, preferably 500 minutes or more, will have sufficient internal strength and be firm enough to function on a heat-shrinkable tape backing.

An appropriate viscosity test is conveniently run with the adhesive coated on an inert, non-sticky backing such as biaxially-oriented and highly heat-set polyethylene terephthalate film. The adhesive thickness is in the range of 1.0 to 1.5 mils and the film backing is conveniently 2.0 mils. A ¼-inch-wide strip of tape is wrapped 360° around a freely rotatable stainless steel rod of 0.238 centimeter radius with one end of the tape extending to a stationary clamp. A constant torque is applied to rotate the rod to apply a shear stress over the full wrap, and the rotational velocity is measured. The test is repeated at several constant torques, and a plot is made of torque vs. velocity from which the angular velocity is taken at a shear rate of 1 sec.$^{-1}$. The viscosity V in poises at the shear rate is calculated using the equation $$V = 6.3 \times 10^7 \, Tt/\omega$$

where $T$ is the torque in gram-centimeters, $t$ is the thickness of the adhesive in centimeters, and $\omega$ is the velocity in degrees per minute. Using this test as an indication for sufficient internal strength, adhesives should have a viscosity of at least $1.0 \times 10^6$ poises to be firm enough for use on shrinkable film backings.

Some of the pressure-sensitive adhesives that have been found to perform satisfactorily in heat-shrinkable tapes of the invention include the class of acrylate-based pressure-sensitive adhesives. In general, this class of adhesive includes polymers based on acrylate monomers consisting of monomeric acrylic acid esters of non-tertiary alkyl alcohols, the molecules of which have from one to 14 carbon atoms, usually between four and 12 carbon atoms. A mixture of different acrylate monomers may be included, but at least a major proportion of the alcohol molecules of the acrylic acid ester should have carbon-to-carbon chains of at least four carbon atoms terminating at the hydroxyl oxygen atom. The acrylate monomers may be copolymerized with a minor proportion of ethylenically unsaturated monomers having strong polar groups such as acrylic acid. These adhesives have been found to have the necessary firmness and internal strength at high temperature. Another useful class of adhesives are adhesives of the rubber-resin type which include natural or synthetic elastomers and a tackifying resin and are made thermosetting such as by inclusion of heat-reactive phenoleformaldehyde resin.

As previously noted, biaxially-oriented polyethylene terephthalate film is a preferred backing material. This film is known to have excellent electrically insulative properties. In addition, polyethylene terephthalate maintains its strength in a condition of thermal exposure and resists melting, properties which are useful in themselves and especially useful in heat-shrinkable tape to resist rupture during a shrinkage process. For example, tape of the invention is often caused to quickly reach shrinking temperature by blowing air over the tape that is at a temperature higher than the shrinking temperature of the tape. Thus, while the best shrinking temperature for polyethylene terephthalate generally is about 300° F., areas of the film may temporarily reach a higher temperature. But the high softening point of polyethylene terephthalate assures that the film will remain strong and not rupture during the shrinking operation.

Biaxially-oriented, biaxially-differentially heat-shrinkable polyethylene terephthalate may be manufactured according to the processes taught in the previously noted patent of Merle L. Erickson. This film can be prepared to have the controlled shrinkage set forth above as desirable for heat-shrinkable tape. The amount of shrinkage desirable depends somewhat on the size of the object being wrapped, larger objects generally requiring a higher shrinkage.

Unplasticized polyvinyl chloride film may also be used as the backing for useful heat-shrinkable tape. While the softening point of polyvinyl chloride is lower than polyethylene terephthalate's, it is moderately high, and polyvinyl chloride has other good properties for an electrically insulating tape. For best results the backings of tapes of the invention may be primed so as to firmly anchor the pressure-sensitive adhesive on the backing. In addition, the backings can be given a low-adhesion backsizing as is well known.

The invention is further illustrated in the examples which follow.

EXAMPLE 1

Tape was prepared using one-mil-thick, biaxially-oriented, biaxially-differentially heat-shrinkable polyethylene terephthalate film prepared in the manner taught in the previously noted patent of Merle L. Erickson and having shrinkages at 150° C of 31 and 14 percent in length and width, respectively. The film was knife-coated on one side, in a 1.1-mil dry thickness, with an adhesive that consisted of a copolymer of 90 parts isooctyl acrylate and 10 parts acrylic acid. The adhesive was applied as a 20-percent-solids solution in a mixture of ethyl acetate and heptane solvents, and after coating, was dried in an oven at a temperature of 66° C. The other side of the film was coated with a thin uniform coat of a low-adhesion backsizing of the polyvinyl N-alkyl carbamate type described in U. S. Pat. No. 2,532,011 and was applied as described therein. This backsize, applied from a 5 percent solution in toluene, was also dried at 66° C. In the tests described above, the adhesive had an inherent viscosity of 1.6 and a shear strength greater than 1000 minutes. The adhesion of the tape was found to be 35 ounces/inch of width and the tape exhibited shrinkages in length and width at 150° C of 32 and 14 percent respectively. The tape was wrapped around objects such as coils and then shrunk by heating to provide excellent tight wrappings around the objects. Some of the samples were heated in an oven in which the temperature was between 150° and 175° C and others were heated by a short exposure to a hot air stream from a hot air gun at a temperature of about 200° C. There was no unwinding or lifting of the tape ends during or after the heat exposure.

EXAMPLE 2

Biaxially-oriented, biaxially-differentially heat-shrinkable polyethylene terephthalate film like that in Example 1, but exhibiting length and width shrinkages at 150° C. of 20 and 7 percent respectively, was used to prepare tape. The film was coated in a thickness of 0.8 mil with a pressure-sensitive adhesive based on a copolymer of 90 parts fusel oil acrylate (in which 55 – 80 percent of the acrylic acid esters are of primary amyl alcohols, 15 – 45 percent of primary butyl alcohols, and 0 – 5 percent of n-propyl alcohol) and 10 parts acrylic acid. This adhesive had a shear strength value in the above test of greater than 1000 minutes. The other side was coated with the same backsizing as in Example 1 and the film was then dried at 66° C. This tape exhibited an adhesion of 38 ounces/inch of width. It had shrinkages of 21 and 6.2 per cent in length and width respectively at 150° C. The shrinkage available in this tape makes it particularly well suited for wrapping and shrinking around can-enclosed capacitors having diameters between about ¼ and 1-½ inches.

EXAMPLE 3

Tape was made from retensilized film that had been prepared by stretching lengthwise between about 1.4 and 1.5 times at 82° C a 1.5-mil-thick polyethylene terephthalate film that had been originally biaxially oriented about three times and heat set at 204° C. This converted the original 1.5-mil film, which had shrinkages of less than two percent in both length and width, to a one-mil film having length and width shrinkages of 25 and 1.3 percent respectively at 150° C. This film was coated on one side with a crude rubber primer solution, dried, and then exposed to ultraviolet radiation in the manner described in U. S. Pat. No. 3,188,266, and over this was coated in a 1.2-mil thickness a firm type thermosetting adhesive that had the following composition:

|  | Parts by Weight |
|---|---|
| Crude smoked rubber sheet | 100 |
| Polymerized terpene resin (Piccolyte S–115) | 60 |
| Wood rosin | 20 |
| Zinc resinate | 5 |
| Phenol-aldehyde resin (Bakelite CKR-1634) | 20 |
| Zinc oxide | 20 |
| Di-tert-amyl hydroquinone | 2 |
| Heptane | 500 |

This adhesive had a shear strength value of greater than 1000 minutes and a viscosity of greater than $90 \times 10^6$ poises. The coated film was dried in an oven at a temperature of 66° C. The other side was coated and dried with a low-adhesion backsizing like that of Example 1. The resulting tape product had length and width shrinkages of 22.5 and 1.3 percent respectively and had an adhesion of 33 ounces/inch of width. When two layers of this tape were wrapped around a ⅜ inch-diameter, 1-inch-long, can-enclosed capacitor such that the tape extended 3/32 inch beyond each end of the capacitor and shrunk by exposure to a stream of hot air from a hot-air gun at a temperature of 204° C., a tight neatly wrapped covering with the edges conforming to the transverse ends of the capacitor, was obtained. There was no lifting of the ends of the tape during or after the shrinking operation.

What is claimed is:

1. Heat-shrinkable pressure-sensitive adhesive tape comprising (1) a strong tough flexible moisture- and solvent-resistant backing selected from biaxially oriented polyethylene terephthalate and polyvinyl chloride backings that shrink when heated to a useful elevated temperature between about 10 and 50 percent in length and between about 0 and 15 percent in width and at least twice as much in length as in width, and (2) firmly united to one side of the backing a pressure-sensitive adhesive that is tacky cohesive and firm at room temperature and at said elevated temperature and that exhibits a shear strength value in the described test greater than 60 minutes and a viscosity in the described test greater than $1.0 \times 10^6$ poises.

2. A tape of claim 1 in which the backing shrinks between about 15 and 30 percent in length and between about 5 and 10 percent in width and the pressure-sensitive adhesive exhibits a shear strength value in the described test greater than 500 minutes.

3. A tape of claim 1 in which the film backing is biaxially-oriented biaxially-differentially heat-shrinkable polyethylene terephthalate.

4. A tape of claim 1 in which the adhesive is a polymer based on an acrylate of a nontertiary alkyl alcohol.

5. A tape of claim 1 in which the adhesive is a firm thermosetting rubber-resin adhesive.

6. Heat-shrinkable pressure-sensitive adhesive tape comprising (1) a strong tough flexible moisture- and solvent-resistant biaxially oriented polyethylene terephthalate backing that shrinks when heated to a useful elevated temperature between about 10 and 50 percent in length and between about 0 and 15 percent in width and at least twice as much in length as in width, and (2) firmly united to one side of the backing a pressure-sensitive adhesive that is tacky cohesive and firm at room temperature and at said elevated temperature and that exhibits a shear strength value in the described test greater than 60 minutes and a viscosity in the described test greater than $1.0 \times 10^6$ poises.

7. A tape of claim 6 in which the film backing shrinks between about 15 and 30 percent in length and between about 5 and 10 percent in width and the pressure-sensitive adhesive exhibits a shear strength value in the described test greater than 500 minutes at said elevated temperature.

8. A tape of claim 6 in which the adhesive is a polymer based on an acrylate of a nontertiary alkyl alcohol.

* * * * *